United States Patent [19]

Hatimaki

[11] Patent Number: 4,819,123
[45] Date of Patent: Apr. 4, 1989

[54] COMPRESSED AIR SUPPLY SYSTEM

[75] Inventor: Takeshi Hatimaki, Akashi, Japan

[73] Assignee: Nippon Air Brake Co., Ltd., Kobe, Japan

[21] Appl. No.: 122,981

[22] Filed: Nov. 19, 1987

[30] Foreign Application Priority Data

Nov. 25, 1986 [JP] Japan ................................. 61-281267

[51] Int. Cl.[4] ............................................. H02H 5/00
[52] U.S. Cl. ........................................ 361/23; 361/28; 417/26; 417/280
[58] Field of Search ...................... 361/22, 23, 28, 29, 361/93, 74; 322/3; 417/1, 18, 19, 26, 27, 279, 280

[56] References Cited

U.S. PATENT DOCUMENTS

| | | | |
|---|---|---|---|
| 3,957,395 | 5/1976 | Ensign | 417/279 X |
| 4,415,943 | 11/1983 | Wartman | 361/22 |
| 4,443,156 | 4/1984 | Dunnam, Jr. | 417/27 X |
| 4,453,893 | 6/1984 | Hutmaker | 417/279 |
| 4,616,485 | 10/1986 | Gillett et al. | 361/22 X |
| 4,722,019 | 1/1988 | Pohl | 361/22 |

Primary Examiner—Derek S. Jennings
Attorney, Agent, or Firm—J. B. Sotak

[57] ABSTRACT

A compressed air supply system including an electric motor for driving an air compressor. An air reservoir connected to an outlet of the air compressor via a cooler. A dryer and a check valve, a pressure sensor coupled to the air reservoir for sensing the pressure therein. An unloading valve coupled to the outlet of the air compressor. A control circuit coupled to the electric motor and the unloading valve. A protective circuit coupled to the control circuit and the unloading valve for preventing the motor from starting under an overload condition and for averting the unnecessary running of the motor and driving of the air compressor.

10 Claims, 2 Drawing Sheets

COMPRESSED AIR SUPPLY SYSTEM

FIELD OF THE INVENTION

This invention relates to a compressed air supply system for use on a railway vehicle, which includes a motor protection circuit for preventing overload.

BACKGROUND OF THE INVENTION

There is a myriad of prior art compressed air supply systems for usage on railway vehicles. For example, Japanese Utility Model Registration No. 57-22979 and Japanese Utility Model Registration No. 54-27603, as well as Japanese Utility Model Registration No. 53-38920, show and disclose a number of different types of compressed air supply systems which were used in the past. Another compressed air supply system is illustrated in FIG. 4 of the present application. As shown, the air supply system 101 includes a compressed air portion 2 and an electrical control portion 103. The compressed air portion 2 is powered by an electric motor 6 which is conected to the main electrical supply circuit 5. That is, the air compressor 7 is driven by the electric motor 6 for charging the air reservoir 10. As shown, the supply path is from the discharge outlet 7a of the air compressor 7 to the input of an intercooler 12 which, in turn, is connected to the discharge pipe 9. The input of a moisture remover is connected to pipe 9 while the output is connected to a check valve 8. Check valve 8 permits air flow from the discharge outlet 7a to the inlet of air reservoir 10. A safety valve 14 is connected between check valve 8 and reservoir 10. A spring-biased, solenoid-operated unloading valve 11 is connected to pipe 9 between the check valve 8 and the air compressor 7. When the solenoid is deenergized, the spring biases the valve 11 to the opened position τ so that pipe 9 is connected to the atmosphere, as shown. Now, when the solenoid is energized, it shifts the valve 11 to the closed position □ which causes the pipe 9 to be blocked off from the atmosphere. At the same time, the air compressor 7 is driven by the energized motor 6 so that compressed air is fed to the air reservoir 10 through the discharge pipe 9 to be used for the operation of the brake system. Preferably, the motor 6 is an induction motor which is simple in construction and is low in price. However, the starting torque of such a motor is small. Therefore, the unloading valve 11 provides that the pressure inside the discharge pipe 9 is low during the start-up operation of the motor 6. The electrical control circuit 103 includes a pressure sensor 15 which has an upper limit pressure portion and a lower limit pressure portion. Thus, the pressure in the air reservoir 10 is sensed so that the main relay 16 opens and closes the main circuit 5. The electric power supply is initially turned ON by the ON-OFF switch 18 and is subsequently opened and closed by the electric contactor 15a of pressure sensor 15. That is, the electric contactor 15a is mechanically linked to the pressure sensor 15, which senses the pressure in air reservoir 10. The electric contactor 15a of the pressure sensor 15 opens the control circuit 103 when the pressure in the air reservoir 10 reaches the upper limit pressure value, and closes the control circuit 103 when the pressure in the air reservoir 10 decreases to the lower limit pressure value. In viewing FIG. 4, and as previously noted, 12 is the cooler, 13 is the moisture-removing device, and 14 is the safety valve. Initially, the air supply system 101 is in a loading mode of operation, since the inside of the air reservoir 10 is at atmosphere. The control circuit 103 is energized by the closure of switch 18 and the closed electric contactor 15a of the pressure sensor 15. When the power supply switch 18 is closed, the main relay 16 and the unloading valve 11 are energized. The energization of solenoid valve 11 shifts to the closed position □ and the energization of relay 16 closes the contacts of the main circuit 5. This energizes the motor 6 and causes it to drive the air compressor 7. The compressed air from the air compressor 7 passes through the cooler 12, the moisture-removing device 13, and the check valve 8 and is accumulated in the air reservoir 10. As noted above at this time, the unloading valve 11 is in the closed position □ so that the exhaust pipe 9 is not opened to the atmosphere. Thus, the pressure inside the discharge pipe 9 and the reservoir 10 begins to build up. When the air pressure in the air reservoir 10 reaches the upper limit pressure value, the pressure sensor 15 detects this and the electric contactor 15a is opened. Thus, the control circuit 103 is deenergized. Then, the main relay 16 and the unloading valve 11 are deenergized. Accordingly, the main circuit 5 is opened, and the motor 6 is stopped. At the same time, the air compressor 7 is stopped and valve 11 is spring-biased to the opened position τ. At the same time, the compressed air in the discharge pipe 9, which is located between the air compressor 7 and the check valve 8, passes through the unloading valve 11 to the atmosphere.

When the control circuit 103 is opened, the compressed air in the air reservoir 10 is consumed or depleted each time the brake system is operated. This causes the pressure in the air reservoir 10 to be reduced until it reaches the lower limit pressure value. The pressure sensor 15 detects this lower limit pressure value and causes the electric contactor 15a and the control circuit 103 to become closed. Then the main relay 16 and the unloading valve 11 are again energized so that the contacts in the main circuit 5 are closed. The motor 6 starts to run and drives the air compressor 7. The energization of the unloading valve 11 causes it to move to the closed position □. However, at this time, the pressure inside the discharge pipe 9 is at atmospheric level so that the initial load on the motor is minimal. However, in such a prior art air supply system 101, the pressure in the discharge pipe 9 will not decrease if the unloading valve 11 is stuck in the closed position □. Conversely, the pressure in the discharge pipe 9 will not build up when there is an air leak in the compressed air circuit 2 or when the unloading valve 11 is stuck in the opened position. Now, when the pressure in the air reservoir 10 becomes less than the lower limit pressure value, the motor 6 becomes energized and the compressor 7 attempts to build up the pressure in pipe 9 and reservoir 10. However, with the unloading valve 11 stuck in its opened position τ, the air is bled off to atmosphere and no buildup occurs. Under this condition, the motor continues to run and is susceptible to burn up. In addition, it is highly uneconomical to keep the motor running continuously.

OBJECTS OF THE INVENTION

It is an object of this invention to develop a system in which the motor will not operate by deenergizing the control circuit if the pressure in the exhaust pipe does not become greater than the upper limit pressure value after a given period of time after the motor starts, or if the pressure in the exhaust pipe does not become less than the lower limit pressure value after a certain period of time after the motor stops.

A further object of this invention is to provide a system having a safeguard circuit which detects when the pressure in the exhaust pipe does not decrease to the first preset value after a predetermined length of time after the upper limit pressure value is detected by the pressure sensor, and which also detects that the pressure in the exhaust pipe does not increase higher than the second preset value after the second predetermined length of time from the time that the lower limit pressure value is detected, which then opens the control circuit based on these conditions.

Another object of this invention is to provide an air supply system having an electric motor, an air compressor driven by the motor, an air tank which is connected to the outlet port of the air compressor via a one-way check valve. An unloading valve is connected to the exhaust pipe between the check valve and the air compressor and has an open position in which the exhaust pipe is connected to the atmosphere. The unloading valve has a closed position in which the exhaust pipe is closed off from the atmosphere. A pressure sensor detects the upper and lower limit pressure values of the pressure in the air tank. A control circuit stops the motor and opens the unloading valve when the pressure sensor detects the upper limit value and which operates the motor and closes the unloading valve when the pressure sensor detects the lower limit pressure value.

Still another object of this invention is to provide a compressed air supply system comprising, protective circuit means for preventing the pressure in a discharge line from dropping below a first preset value after the expiration of a first predetermined length of time and after detection of an upper limit pressure value by the pressure sensor. The protective circuit also detects and prevents the pressure in the discharge line or pipe from rising above a second preset value after the expiration of a second predetermined length of time when the lower limit pressure value is detected. The protective circuit opens a control circuit in response to the detected conditions. The compressed air supply system includes an electric motor, an air compressor driven by the electric motor, an air reservoir connected to a discharge outlet of the air compressor via the check valve, and an unloading valve connected to the discharge line or pipe between the check valve and the air compressor. The unloading valve has an open position in which the discharge line or pipe is connected to the atmosphere and has a closed position in which the discharge line or pipe is cut off from the atmosphere. A pressure sensor which detects the upper limit pressure value and the lower limit pressure value appearing in the air reservoir. A control circuit stops the motor and shifts the unloading valve to the open position when the upper limit pressure value is sensed by the pressure sensor and starts the motor and shifts the unloading valve to the closed position when the lower limit pressure value is sensed by the pressure sensor.

SUMMARY OF THE INVENTION

An air supply system includes a safeguard logic circuit which detects when the pressure in an exhaust pipe has not gone below the first preset value after a first predetermined length of time has expired. When a pressure sensor detects that an upper limit pressure value has been reached, it releases a control circuit to stop an electric drive motor. The activation of the control circuit is separate and independent from the activation of the pressure sensor. If the pressure sensor detects the lower limit pressure value, it closes the control circuit. Thus, it keeps the control circuit open so that the motor remains turned OFF. Therefore, burnout of the motor due to an overload condition is prevented. In addition, when the safeguard logic circuit detects that the pressure in the exhaust pipe will not rise higher than a second preset value after the expiration of a second predetermined length of time, it stops the motor. When the pressure sensor detects the lower limit pressure value, it closes the control circuit to stop the motor so that unnecessary or needless operation of the motor can be avoided.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
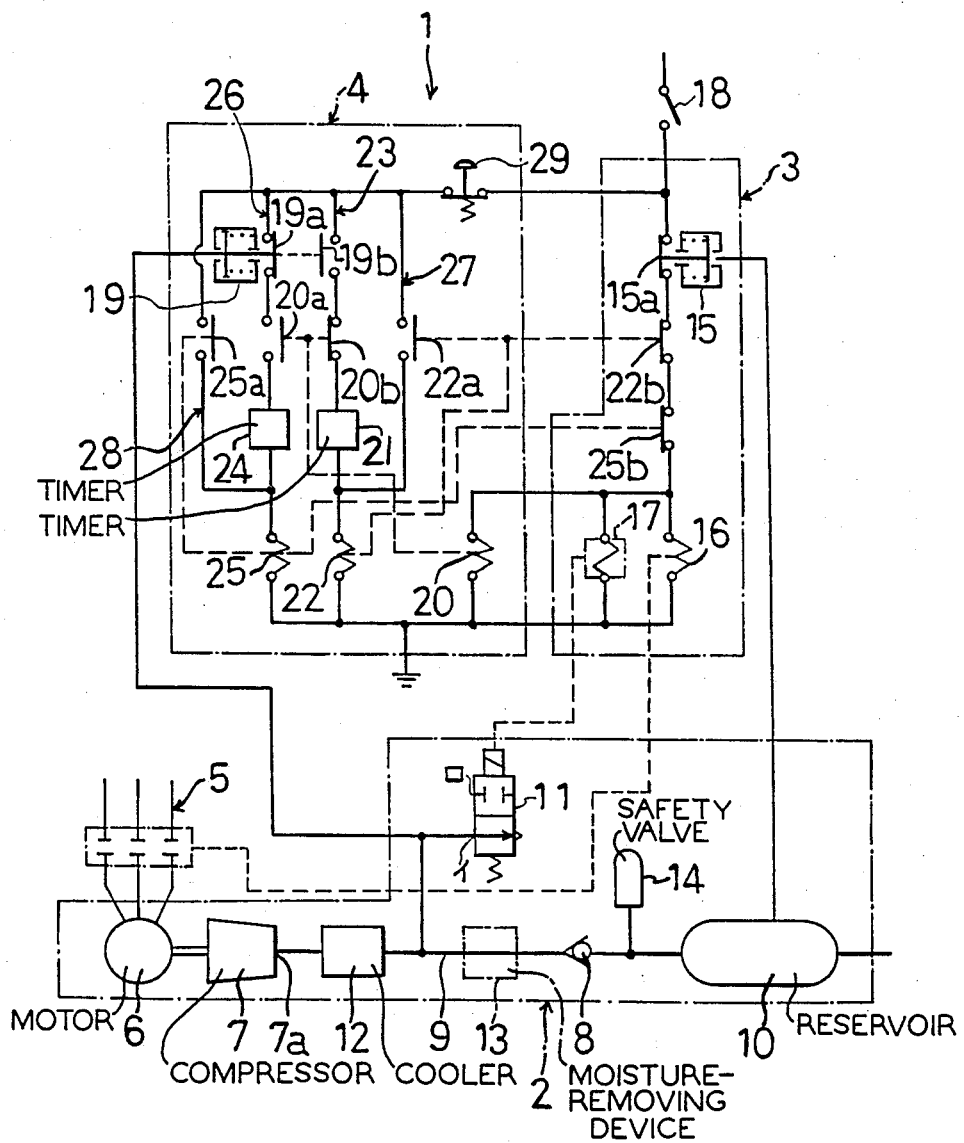
FIG. 1 is a schematic circuit diagram of one embodiment of an air supply system of the present invention.

Referring now to the drawings, and in particular to FIG. 1, there is shown an air supply system which has a safeguard circuit embodying the present invention.

Figure 4:
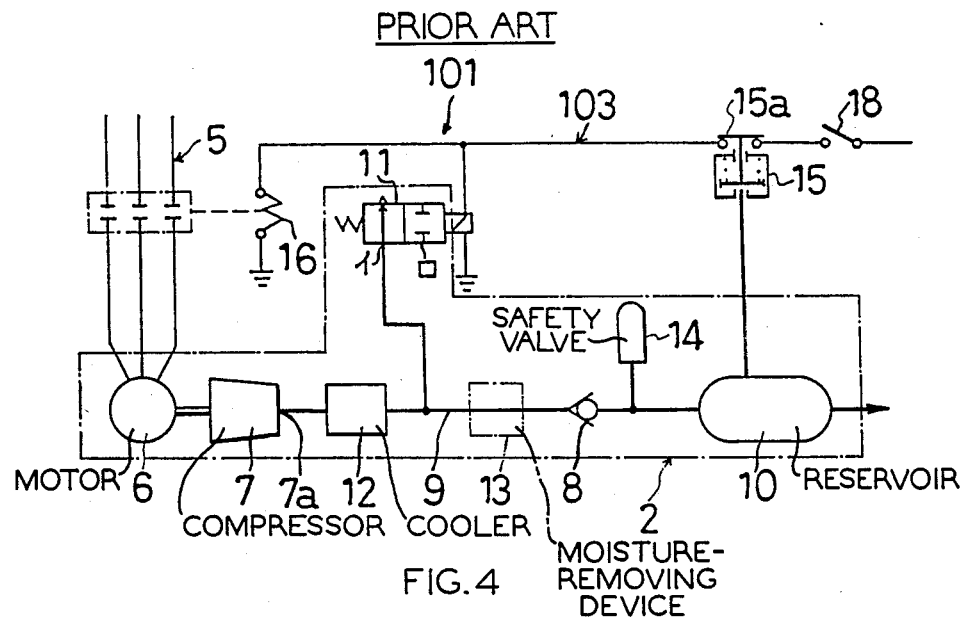
FIG. 4 is a schematic circuit diagram of a prior art air supply system.

The same components or parts which are the same as those existing in FIG. 4 of the drawings are symbolized with characters and a detailed explanation thereof is omitted for the purpose of convenience.

The air supply system 1 of the preferred embodiment of this invention includes a compressed air circuit 2 and a control circuit 3, which are substantially the same as those shown and described in FIG. 1. The control circuit 3 includes the normally closed electrical contact point 22b of the first detector relay winding 22, which will be described later, and includes the normally closed electrical contact point 25b of the second detector relay winding 25, both of which are connected in series with the electrical contact point 15a of the pressure sensor or switch 15. The main relay winding 16 and the solenoid winding 17 of the unloading valve 11 are connected in parallel with each other. A safeguard or protective circuit 4 includes a first detector circuit 23 having a normally open electrical contact point 19b of the pressure sensor or switch 19 which is responsive to the pressure in the exhaust pipe 9. A normally closed electrical contact point 20b of a supplemental relay winding 20 is connected in parallel to the main relay winding 16 of the control circuit 3. A first electrical timer 21, which is a delay-type timer, and the first detector delay winding 22 are connected in series. A second detector circuit 26 includes an electrical cntact point 19a of the pressure sensor or switch 19 which is connected to the normally open electrical contact point 20a of the supplemental relay winding 20. A second electrical timer 24, which is a delay-type timer, and the second detector relay winding 25 are connected in series. A first self-maintaining or stick circuit 27 and the first detector relay winding 22 and its normally open electrical contact point 22a are connected in series. A second self-maintaining or stick circuit 28 and the second detector delay winding 25 and its normally open electrical contact point 25a are connected in series. A pushbutton spring-biased reset switch 29 is arranged to release the first self-maintaining circuit 27 and the second self-maintaining circuit 28. The pressure switch 19 includes an electrical contact point 19b, which closes the first detector circuit 23 when the pressure in the exhaust pipe 9 is higher than the first present value $P_1$ and includes an electrical contact point 19a which closes the second detector circuit 26 when the pressure in the exhaust pipe 9 is lower than the second preset value $P_2$.

An explanation of the operation of the air supply system of the subject invention will be described hereinafter.

When the power switch 18 is initially closed, the pressure in the air tank or reservoir 10 is at atmospheric pressure, since the electrical contact point 15a of the pressure sensor of switch 15, the normally closed electrical contact point 22b of the first detector relay winding 22, as well as the normally closed electrical contact point 25b of the second detector relay winding 25 are closed. Thus, the solenoid winding 17 and the supplemental relay winding 20 become energized. Then, the main circuit 5 is closed by the main relay winding 16 and the motor 6 is energized and drives the air compressor 7. At the same time, the unloading valve 11 is shifted to the closed position and the normally open electrical contact point 20a of the second detector circuit 26 is closed. At this time, the pressure in the exhaust pipe 9 is also atmospheric pressure so the electrical contact point 19a of the pressure sensor or switch 19 keeps the second detector circuit 26 closed. Accordingly, the second electrical timer 24 begins its timing cycle. However, the unloading valve 11 is in the closed position □ so there is no connection to the atmosphere and the air compressor 7 is running. Therefore, the compressed air accumulates in the air tank 10 and the pressure inside the exhaust pipe 9 goes higher than the second preset value $P_2$ within the second predetermined length of time $S_2$. Thus, the electrical contact point 19a of the pressure sensor or switch 19 releases the second detector circuit 26. Therefore, the electrical connection to the second electrical timer 24 is opened and the second detector relay winding 25 is not energized, and the normally closed electrical contact 25b keeps the control circuit 3 closed. When compressed air accumulates in the air tank 10 and when the pressure in the exhaust pipe 9 goes higher than the first preset value $P_1$, the electrical contact point 19b of the pressure sensor or switch 19 closes the first detector circuit 23. However, the electrical contact point 15a of the pressure sensor or switch 15 keeps the control circuit 3 closed so that the normally closed electrical contact point 20b of the supplemental relay winding 20 keeps it open. Thus, no electricity flows through the first electrical timer 21 and the first detector relay winding 22 is not energized. The normally closed electrical contact point 22b keeps the control circuit 3 closed. When compressed air accumulates in the air tank 10 and when the pressure in this air tank 10 reaches the upper limit pressure value, the electrical contact point 15a of the pressure sensor or switch 15 is released. Therefore, the main relay winding 16, the solenoid winding 17, and the supplemental relay winding 20 are energized. The main circuit 5 is released by the main relay winding 16 so that the motor 6 stops. At the same time, the unloading valve 11 is shifted to its open position and the compressed air in the exhaust pipe 9 is released to the atmosphere. The normally open electrical contact point 20a of the supplemental relay winding 20 is released and the normally closed electrical contact point 20b is closed. At this time, the pressure in the exhaust pipe 9 decreases below the first preset value $P_1$ within the first predetermined length of time $S_1$. Thus, the electrical contact point 19b of the pressure sensor or switch 19 energizes the first detector circuit 23. Furthermore, when the pressure is lower than the second preset value $P_2$, the electrical contact point 19a of the pressure sensor or switch 19 closes the second detector circuit 26. However, the normally open contact point 20a is still open. Therefore, the first detector relay winding 22 and the second detector relay winding 25 are not energized, and the normally closed electrical contact points 22b and 25b of each relay winding stay closed. In addition, when the compressed air in the air tank 10 is used by the brake system, the pressure in this air tank 10 eventually reaches the lower limit pressure value. Thus, the electrical contact point 15a of the pressure sensor or switch 15 closes the control circuit 3. Therefore, the main relay winding 16, the solenoid winding 17, and the supplemental relay winding 20 are energized. Thus, the main relay winding 16 closes the main circuit 6 so that the motor begins to run and operates the air compressor 7. At the same time, the unloading valve 11 is switched to its closed position □, and the normally open electrical contact point 20a of the supplemental relay winding 20 in the second detector circuit 26 is closed and moves to the same position as when the electric power supply switch 18 is turned ON and the operation is repeated.

Figure 2:
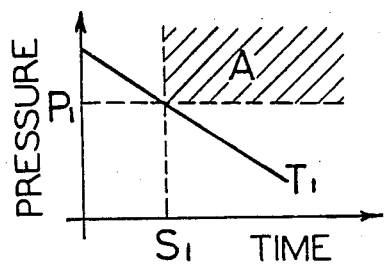
FIGS. 2 and 3 are response graphics of time versus pressure of the pressure declining and rising lines in the limit areas in which the safeguard logic circuit of FIG. 1 operates.

Let us assume that the pressure in the exhaust pipe 9 does not go lower than the first preset value $P_1$ and that the first predetermined length of time $S_1$ expires. If the unloading valve 11 fails so that it is not able to switch from the closed position □, the motor 6 stops but the pressure in the exhaust pipe 9 does not go lower than the first preset value $P_1$ within the first predetermined length of time $S_1$. As seen in FIG. 2, when the pressure declining line $T_1$ comes within the detecting area A, the electrical contact point 19b of the pressure sensor or switch 19 closes the first detector circuit 23. The normally closed electrical contact point 20b of the supplemental relay winding 20 keeps the first detector circuit 23 closed while the first electrical timer 21 measures the first predetermined length of time $S_1$. Thus, the first detector relay winding 22 is energized. Then, the normally open electrical contact point 22a of this first detector delay winding 22 closes the first self-maintaining circuit 27. At the same time, the normally closed electrical contact point 22b opens the control circuit 3 so that the pressure sensor or switch 15 detects the lower limit pressure value. Thus, the control circuit 3 is closed by the electrical contact point 15a and the motor 6 will not operate. At this time, even if the first detector circuit 23 is open, the control circuit 3 is kept open by the first self-maintaining circuit 27, and the motor 6 remains OFF. Thus, the pressure in the exhaust pipe 9 does not decrease, this safeguard circuit 4 detects it and stops the motor 6 to prevent it from burning out due to an overload.

Figure 3:
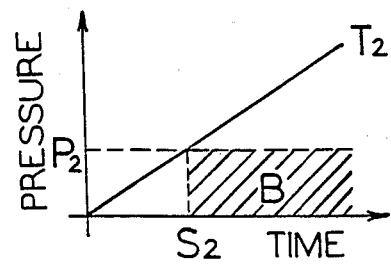

Now, let us assume that the pressure in the exhaust pipe 9 does not go higher than the second preset value $P_2$ and that the second predetermined length of time $S_2$ has expired. When such a condition occurs, the unloading valve 11, since it is not able to switch from the open position τ, or when the exhaust pipe 9 breaks, the air compressor 7 will be continually driven by the motor 6 since the pressure in the exhaust pipe 9 is incapable of rising higher than the second preset value $P_2$ within the second predetermined length of time $S_2$. The pressure rising line $T_2$, as shown in FIG. 3, comes within the detecting area B and the electrical contact point 19a of the pressure sensor or switch 19 closes the second detector circuit 26. The normally open electrical contact point 20a of the supplemental relay winding 20 keeps the second detector circuit 26 closed and the second electrical timer 24 measures the second predetermined length of time $S_2$. This causes the second detector relay winding 25 to be energized. Then, the normally open electrical contact point 25a of the second detector relay winding 25 closes the second self-maintaining circuit 28. At the same time, the normally closed electrical contact point 25b opens the control circuit 3 and deenergizes the main relay winding 16 by the solenoid winding 17. The supplemental relay winding 20 and the main circuit 5 are opened so that the motor 6 is stopped. At the same time, the second detecting circuit 26 is opened. However, the control circuit 3 is kept open by the second self-maintaining circuit 28 so that the motor remains OFF. Thus, when the pressure in the exhaust pipe 9 does not rise, the safeguard circuit detects it and stops the motor and prevents the air compressor from burning up or doing useless work.

Self-maintenance of the first self-maintaining circuit 27 and the second self-maintaining circuit 28 is accomplished by resetting the reset switch 29. In addition, when the first detector relay winding 22 and the second detector relay winding 25 are energized, for example, when problems occur in the unloading valve or in the exhaust pipe, it is obvious that an alarm may be lit and/or sounded.

As is clear from the explanation above, this invention prevents motor burnout due to overload caused by a failure of the unloading valve. The invention also prevents uneconomical operating costs, due to unnecessary motor operation, by employing a safeguard circuit. In addition, the use of fuses, which is another method of preventing motor burnout, increases operating error. It is possible to use a motor which does not have an unloading valve where startup torque is high. This has the advantage of reducing loss during normal operation.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in that is claimed. It will be understood that variations, modifications, equivalents, and substitutions for components of the above specifically described embodiment of the invention may be made by those skilled in the art without departing from the spirit and scope of the invention as set forth in the appended claims.

I claim:

1. A compressed air supply system comprising, a protective circuit means for preventing the pressure in a discharge pipe from dropping below a first preset value after the expiration of a first predetermined length of time and after detection of an upper limit pressure value, the protective circuit also detects and prevents the pressure in the discharge pipe from rising above a second preset value after the expiration of a second predetermined length of time when the lower limit pressure value is detected, said protective circuit opens a control circuit in response to the detected conditions; the compressed air supply system includes an electric motor, an air compressor driven by the electric motor, an air reservoir connected to a discharge pipe of the air compressor via the check valve, an unloading valve connected to the discharge pipe between the check valve and the air compressor, the unloading valve has an open position in which the discharge pipe is connected to the atmosphere and has a closed position in which the discharge pipe is cut off from the atmosphere, a pressure sensor which detects the upper limit pressure value and the lower limit pressure value appearing in the air reservoir, and a control circuit stops the motor and shifts the unloading valve to the open position when the upper limit pressure value is sensed by the pressure sensor and operates the motor and shifts the unloading valve to the closed position when the lower limit pressure value is sensed by the pressure sensor.

2. The compressed air supply system, as defined in claim 1, wherein the protective circuit includes a first detecting circuit having a normally open contact or a pressure sensor which is responsive to the pressure in the discharge pipe.

3. The compressed air supply system, as defined in claim 2, wherein the protective circuit includes a second detecting circuit having a normally closed contact of the pressure sensor.

4. The compressed air supply system, as defined in claim 2, wherein the first detecting circuit includes a normally closed contact which is operated by a supplemental relay.

5. The compressed air supply system, as defined in claim 3, wherein the second detecting circuit includes a normally open contact which is operated by the supplemental relay.

6. The compressed air supply system, as defined in claim 2, wherein the first detecting circuit includes a first time delay timer.

7. The compressed air supply system, as defined in claim 3, wherein the second detecting circuit includes a second time delay timer.

8. The compressed air supply system, as defined in claim 2, wherein the first detecting circuit includes a first detector relay having a normally open contact which, when closed, provides a stick circuit for the first detector relay.

9. The compressed air supply system, as defined in claim 3, wherein the second detecting circuit includes a second detector relay having a normally open contact which, when closed, provides a stick circuit for the second detector relay.

10. The compressed air supply system, as defined in claim 2, wherein the pressure sensor is coupled to the unloading valve.

* * * * *